S. T. WALKUP.
FLOWER PRESS.
APPLICATION FILED FEB. 7, 1919.

1,378,741.

Patented May 17, 1921.
6 SHEETS—SHEET 1.

Inventor
Samuel Thomas Walkup

S. T. WALKUP.
FLOWER PRESS.
APPLICATION FILED FEB. 7, 1919.
1,378,741.
Patented May 17, 1921.
6 SHEETS—SHEET 2.
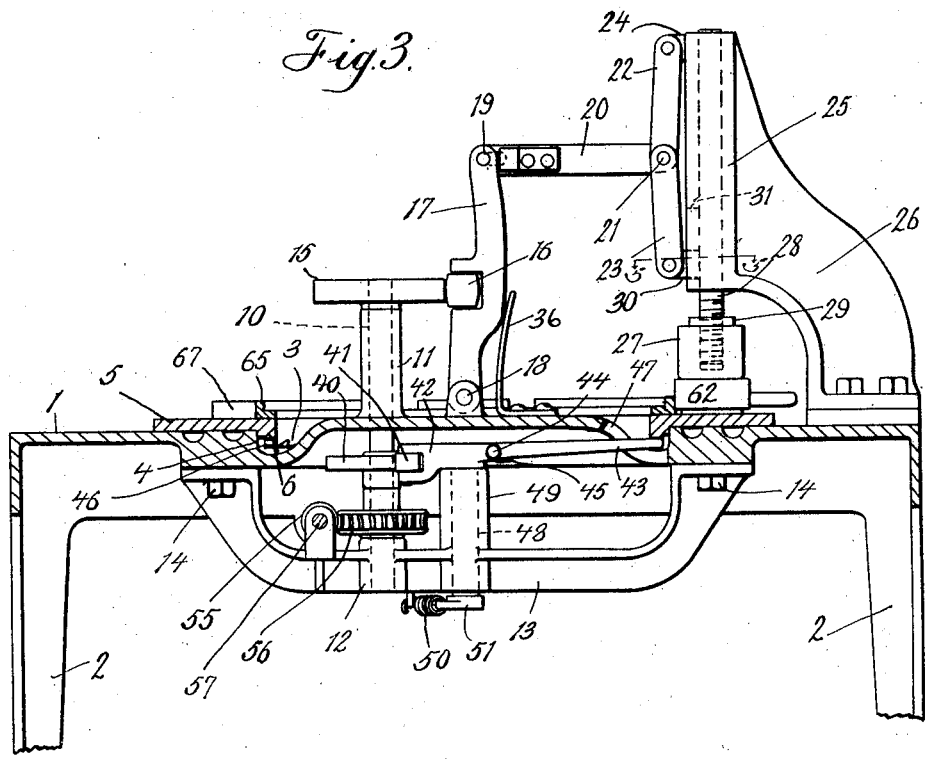
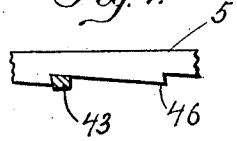
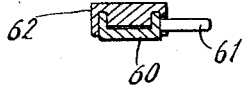
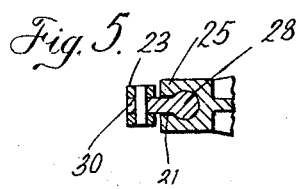
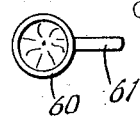
Inventor
Samuel Thomas Walkup

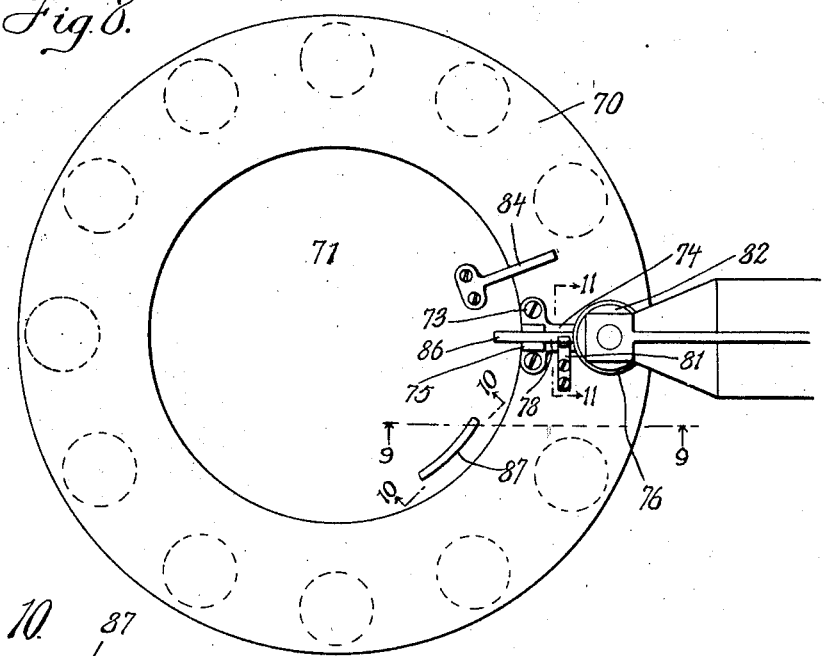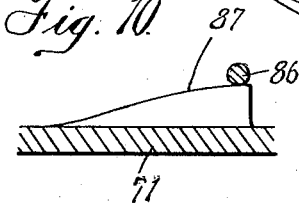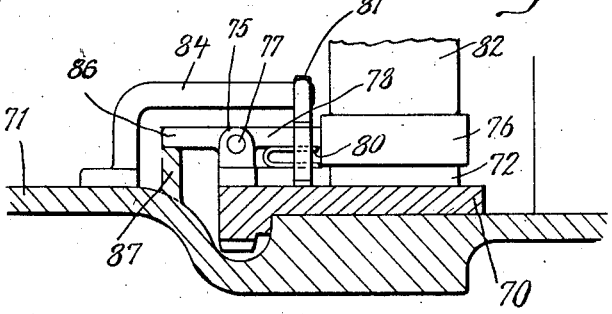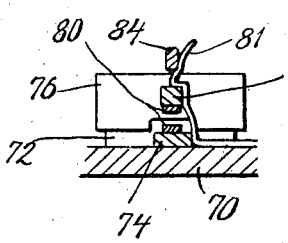

S. T. WALKUP.
FLOWER PRESS.
APPLICATION FILED FEB. 7, 1919.

1,378,741.

Patented May 17, 1921.
6 SHEETS—SHEET 4.

Inventor
Samuel Thomas Walkup

S. T. WALKUP.
FLOWER PRESS.
APPLICATION FILED FEB. 7, 1919.

1,378,741.

Patented May 17, 1921.
6 SHEETS—SHEET 5.

Inventor
Samuel Thomas Walkup

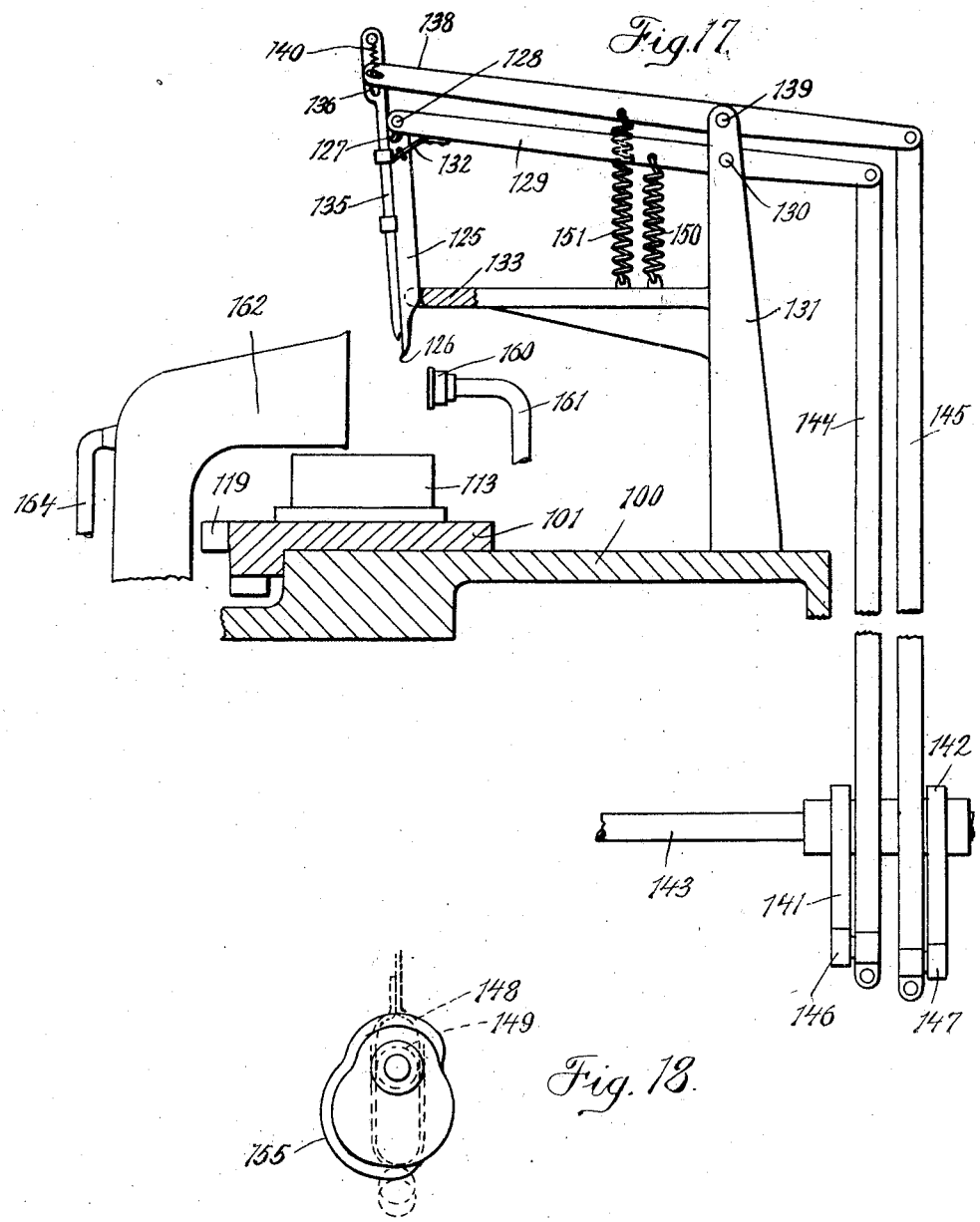

UNITED STATES PATENT OFFICE.

SAMUEL THOMAS WALKUP, OF NEW YORK, N. Y.

FLOWER-PRESS.

1,378,741.

Specification of Letters Patent.

Patented May 17, 1921.

Application filed February 7, 1919. Serial No. 275,666.

*To all whom it may concern:*

Be it known that SAMUEL THOMAS WALKUP, a citizen of United States of America, residing at 875 West 180th street, New York city, borough of Manhattan, New York, has invented new and useful Improvements in Flower-Presses, of which the following is a specification.

This invention relates to presses and more particularly to flower presses and it has for an object to provide a novel and simple arrangement of parts for feeding the desired objects under the press alternately with the action of the latter.

A further object is to provide a simple and inexpensive mechanism for operating the presser head of a press.

For further comprehension of the invention, and of the objects and advantages thereof reference will be had to the following description and accompanying drawings, and to the appended claims in which the various novel features of the invention are more particularly set forth.

Figure 1 of the drawings is a plan view of a press constructed according to my invention.

Fig. 3 is an axial sectional view of the press.

Fig. 4 is a detail view showing the manner in which the work-slide shifting arm engages therewith.

Fig. 5 is a detail horizontal section on the line 5—5 of Fig. 3.

Fig. 6 is a vertical sectional view of a die used in forming artificial flowers.

Fig. 7 is a plan view of the female member of the die.

Fig. 8 is a fragmentary plan view of a modified embodiment of the invention.

Fig. 9 is an enlarged detail section on the line 9—9 of Fig. 8.

Fig. 10 is an enlarged detail section on the line 10—10 of Fig. 8.

Fig. 11 is an enlarged detail section on the line 11—11 of Fig. 8.

Fig. 12 is a similar view to Fig. 3 showing a further modification.

Fig. 13 is a fragmentary horizontal section on the line 13—13 of Fig. 12.

Fig. 17 is an enlarged detail elevation of the pick-up device.

Fig. 18 is a detail face view of the operating cams for the pick-up device.

Figure 1:
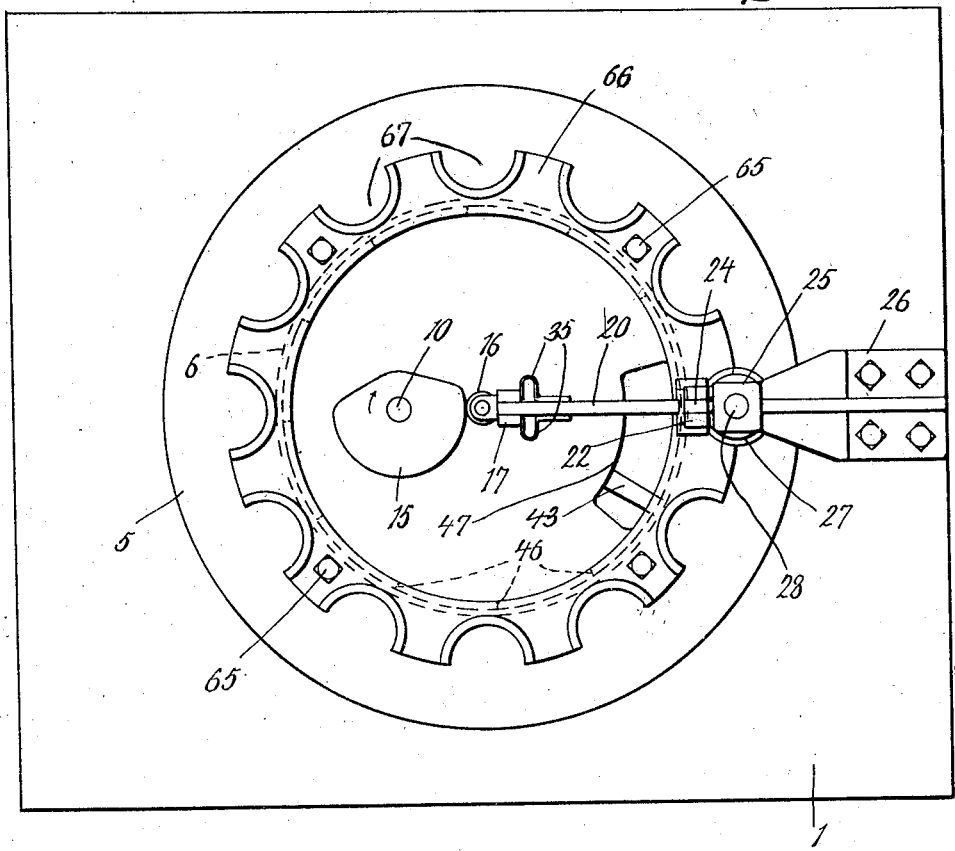
Figure 2:
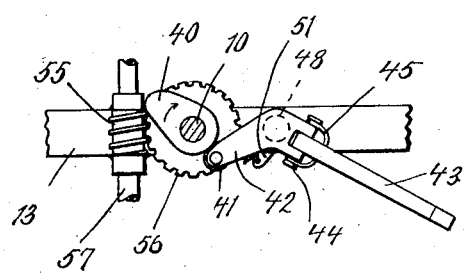
Fig. 2 is a fragmentary horizontal section taken just under the table to show the work-slide shifting means and the worm drive.

As here shown my improved press comprises a table 1 provided with legs 2, and having an annular depression 3 in the top thereof. The outer wall 4 of this annular depression serves as a centralizing guide for an annular work-slide 5 having at its inner edge a downturned flange 6 which projects into the depression 3 in slidable engagement with the wall 4. The objects to be acted upon by the presser head are placed upon this slide which I therefore term a work-slide.

A vertical shaft 10 projects through the table 1 inside the ring being suitably mounted at its upper end in a bearing 11 on the table and at its lower end in a bearing 12 carried by a yoke 13 secured by bolts 14 to the underside of the table. The upper end of the shaft 10 has fixed thereto a cam 15 which engages a roller 16 on a vertical arm or lever 17 pivoted as at 18 to the table 1. The upper end of the arm 17 projects above the roller 16 and is connected by a slot and pin connection 19 to one end of a horizontal link 20 whose other end is pivoted as at 21 to the meeting ends of a pair of toggle bars 22 and 23. The toggle bar 22 extends upwardly from the hinge point 21 and is pivoted to a lug 24 on the upper end of a vertical presser head guide 25 formed integral with a standard 26 fixed on the table 1 outside the slide 5. The guide 25 is laterally offset from the base of the standard to project over the slide 5 and accommodate a presser head 27 under which the slide extends.

This presser head 27 is mounted on the lower end of a rod 28 slidable in the guide 25. As here shown an adjustable connection is formed between the rod 28 and presser head 27 by screwing the rod into a suitable topped opening in the presser head, a lock nut 29 serving to hold the presser head against displacement.

The toggle bar 23 connects at its lower end to a lug 30 projecting laterally from the rod 28 through a slot 31 in the guide 25.

The purpose of the slot and pin connection 19 between the upper end of the arm 17 and the link 20 is to allow the arm to bear on a pair of springs 35 carried by the link thereby relieving the excessive strain on the parts should the presser head meet unusual resistance. The arm 17 is yieldingly pressed toward the cam 15 by a flat spring 36 secured to the table 1 and which acts to retract the arm and lift the presser head.

The work-slide advancing means as here shown comprises a second cam 40 fixed to the shaft 10, this cam being located below the table 1, and engaging with a roller 41 on the end of an arm 42 forming one arm of a lever, the other arm 43 whereof is hinged at 44 and pressed upwardly by a spring 45 to cause its outer end to engage successively with ratchet teeth 46 projecting downwardly from the slide 5 into the depression 3, the arm 43 projecting through a segmental opening 47 in the table 1. The lever formed by the two arms 42 and 43 is fulcrumed concentrically of the slide 5 by means of the projecting stud 48 on a boss 49 on the bracket. The lever is pressed toward the cam 40 by means of a tension spring 50 secured at one end to the yoke 13 and at its opposite end to an arm 51 fixed on the lower end of the stud 48 which projects below the yoke.

The shaft 10 is rotated by means of a worm pinion 55 which engages with a worm gear 56 on the shaft 10, the pinion 55 being fixed on a shaft 57 which may be driven from any suitable source of power.

The press here shown as embodying my invention is intended more particularly for use in making artificial flowers, the dies for which are illustrated in Figs. 6 and 7 and comprise a female member 60 having a handle 61, and a male member 62 fitting down upon the female member. To properly position these dies upon the work-slide the latter has removably secured thereto, as by the bolts 65, a ring 66 having a series of recesses 67 formed in accordance with the shape of the dies 60, 61, it being obvious that different rings, having recesses corresponding to the different dies that are used, may be provided.

The throw of the arm 43 from the cam 40 will, of course, be proportioned so as to cause the slide 5 to move through an arc corresponding to the spacing of the recesses 67 at each rotation of the cam, the spacing of the teeth 46 corresponding to that of the recesses 67 as shown in Fig. 1.

It is thought that the operation of my improved press will be apparent from the above description. The operator keeps the work-slide 5 supplied with filled dies which are advanced in succession to a position under the presser head by the cam 40 and arms 42 and 43, the cam starting the slide in motion without any jar, the spring and hinge connection of the arm 43 allowing the latter to move freely back under the influence of spring as will be apparent.

Alternately with the action of the slide advancing means the cam 15 moves arm 17 forward and forces the presser head down. When the fall in cam 15 engages roller 16 the spring 36 moves arm 17 back and lifts the presser head.

In Figs. 8 to 11 I have shown a modified arrangement in which the dies are attached to the work-slide and means are provided whereby the dies are automatically opened and closed as the slide advances.

In this modification a circular work-slide 70 is mounted as before described in a table 71. As here shown the female dies 72 are fixed to the work-slide by means of screws or bolts 73 passing through rigid arms 74 projecting from the dies. These arms 74 have integral hinge ears 75 to which the male dies 76 are hinged as at 77 by means of rigid arms 78 extending from the male dies.

Springs 80 positioned between the arms 74 and 78 and secured to the latter act to throw the male dies up, spring latches 81 holding the dies closed as they approach the presser head, here indicated at 82. The dies are released from the latches by means of detents 84 fixed to the table 71 adjacent the presser head, which engage the latches 81 as the dies are advanced from the presser head subsequent to the pressing operation, thus withdrawing the latches from the arms 78 and allowing the springs to throw the male dies up.

Projecting rearwardly from the arms 78 of the male dies are integral tails 86 which engage a rise 87 on the table 71 as the dies again approach the presser head after having the pressed flower removed and a new one inserted. When the tails 86 engage this rise the male dies are swung down to closed position and the latches snap into place.

In the views of this modification I have not illustrated the operating means for the presser head and work-slide since the operating means is the same as that shown in Figs. 1 to 5.

In Figs. 12 to 18 I have shown an additional modification in which automatic means are provided for removing the pressed leaf or petal from the die.

This modification comprises a table 100 similar to the table 1 and having mounted thereon an annular work-slide 101, similar to the work-slide 5 and intermittently advanced by similar means comprising a bell-crank 103, and cam 104, the latter being on a vertical shaft 105 on whose upper end is a cam 106, similar to the cam 15, and operating the toggle-links 107, through to arm 108 and link 109 as previously described. The toggle-link connect to a stem 110 in a standard 111, the lower end of the stem having fixed thereon the male member 112 of the dies instead of a presser head. A series of female die members 113 are spaced around the work-slide 101.

To insure of proper positioning of the female die at each movement of the work-slide I provide an angular locking arm 115 pivoted as at 116 on a bracket 117 carried under the table 100, the locking arm projecting through a slot 118 in the table and engaging in notches 119 in the work-slide 101. The locking arm is withdrawn from the notches by means of a cam 120 fixed on the shaft 105 and is moved into the notches by the spring 121, the cam being timed to work just in advance of the presser head.

I have here indicated both mechanical and pneumatic means as suitable for employment in removing the pressed leaf, the mechanical means here shown comprising a pick-up bar 125 having an inturned point 126 on its lower end and having its upper end provided with a curved slot 127 through which passes a pin 128 in the end of a walking beam 129 pivoted as at 130 to a standard 131 on the table 100. A spring 132 tends to press the bar 125 downwardly and outwardly against a guide 133 formed on the standard 131.

A needle bar 135 is slidably mounted on the front of the pick-up bar and has a slot and pin connection 136 with a second walking beam 138 pivoted as at 139 on the standard 131, a spring 140 normally pressing the needle bar downwardly relatively to the walking beam.

The walking beams are operated to lift the bars 125 and 135 by a pair of cams, 141 and 142 respectively, on a horizontal shaft 143 through the medium of a pair of links 144 and 145 which carry rollers 146 and 147 on their lower ends which project under the cams. To retain the rollers in position each of the links has a loop 148 in its lower end which engages in grooves 149 formed in the cam hubs, sufficient play being allowed for the slight oscillatory movement of the links. To move the pick-up and needle bars downward springs 150 and 151 are connected at one end to the member 133 and at opposite ends to the walking beams 129 and 138 respectively.

Figure 14:
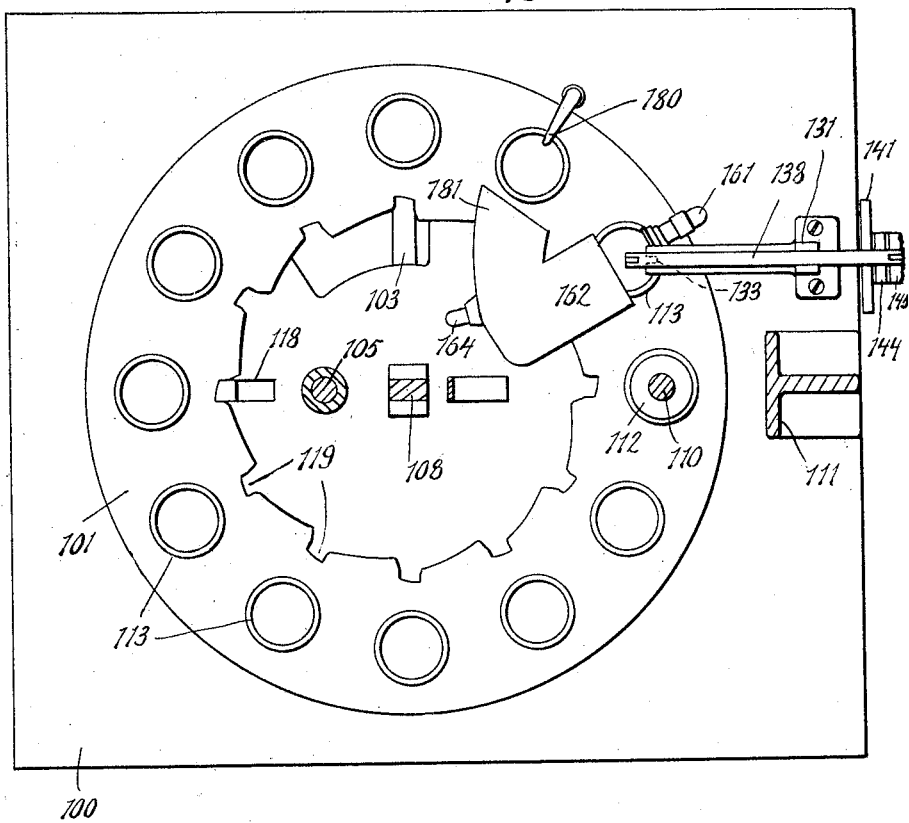
Fig. 14 is a horizontal section on the line 14—14 of Fig. 12 but showing the pick-up devices in elevation.
Figure 15:
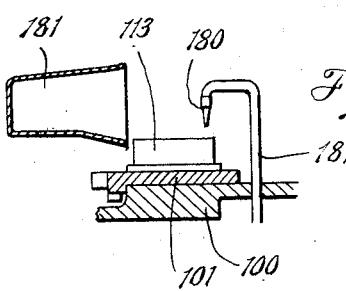
Fig. 15 is a detail view of the pneumatic leaf removing device.
Figure 16:
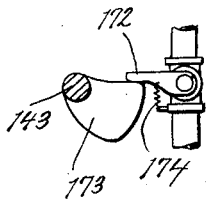
Fig. 16 is a detail view of the valve controlling the air and its operating cam.

As shown in Fig. 14 this pick-up device is located directly above the point at which each female die comes to rest after the leaf has been pressed, and the guide 133 is so positioned as to cause the end of the pick-up bar to slide down the inside wall of the die and then finally be thrown inward by engagement of the pin 128 with the curved lower end of the slot 127.

The cams 141 and 142 are so arranged (see Fig. 18) as to cause the pick-up bar and the needle bar to descend in unison until the point of the pick-up bar is being thrown inwardly as above set forth, at which time the rise 155 on cam 142 causes the needle bar to descend and catch the edge of the leaf and the bars to ascend with the needle bar in this position, the needle bar raising on the pick-up bar when the latter is at the top of its stroke. The loose spring connection between the two bars and the walking beams compensates for any inaccuracy of movement of the latter. The shaft 143 may be driven from a shaft 156 on which is a worm pinion 157 meshing with a worm gear 158 on the shaft 143. Shaft 143 may drive shaft 105 through the bevel gears 159 and 160 located on the respective shafts.

As the pick-up bar is nearing its topmost position a jet of air from a nozzle 160 on a pipe is caused to impinge upon the leaf and blow it into a receiving funnel 162 which may lead downwardly to a suitable receptacle 163. A suction pipe 164 may connect to the funnel 161 as shown. The pipe 161 may connect to a blower 165 and the pipe 164 to a suction fan 166 which may both be driven as indicated at 167 from the shaft 156.

A valve 170 is placed on the pipe 161 and a valve 171 on the pipe 164. Each valve has an arm 172 (see Fig. 16) which is engaged by a cam 173 on the shaft 143 to open it at the proper time being closed by a spring 174.

As supplementary to the mechanical leaf removing means, or for use alone, I provide a nozzle 180 located adjacent the next stopping point of the dies and which directs a jet of air down inside the latter to blow any leaf, which may not have been entirely removed into a branch mouth 181 of the funnel. The nozzle 180 connects by a pipe 182 to the pipe 16.

I have indicated a gas pipe 185 and tip 186 whereby the table may be heated at the point where the leaf is pressed.

What I claim is as follows:

1. In a press, a presser member, a slide adapted to carry an object to said presser member to be acted upon thereby, and means for alternately operating said presser member and moving said slide, including a pair of rocker arms in operative relation respectively with said presser member and slide and a pair of cams in respective engagement with said rocker arms.

2. A press comprising a table having an annular depression, an annular work-slide carried by said table and having a part projecting into said annular depression, a presser head, means for operating said presser head, an oscillatory arm engaging the said part of the work-slide, and means for operating said arm to advance the work-slide alternately with the action of the presser head.

3. In a press, the combination with male and female die members, of an automatic mechanical pick-up adapted to remove the article pressed, a receiving conduit arranged adjacent the said pick-up and means for exerting an air suction in said conduit.

4. In a press, the combination with male and female die members, of an automatic mechanical pick-up adapted to remove the article pressed, said pick-up comprising a pick-up bar adapted to engage under the article and a member adapted to slide on said bar to clamp down on the article.

5. In a press, a rotary die supporting table, a presser head located over one side of said table, means for intermittently rotating said table and operating said presser head, and means for causing an air current to impinge upon the work in the die to remove it therefrom, said means being adapted to cause the air current to act intermittently and at times when the table is at rest.

6. In a press, a rotary table, a series of dies spaced therearound, a presser head, a drive shaft for said presser head and table, a compressed air nozzle and a receiving conduit arranged adjacent to one of the die stations, means for producing an air jet through said nozzle, means for creating a suction into the mouth of said conduit, said means including pipes leading into said nozzle and conduit, valves on said pipes, and members carried by said drive shaft adapted to intermittently operate said valves.

7. In a press, a presser head, means for operating the same, an annular work slide, a cam shaft extending upwardly in the space inclosed by said slide, means for imparting intermittent rotary movement to said slide, means for locking said slide, and a series of cams on the said cam shaft operating all of the above mentioned means.

8. In a press, a pick-up device for the article pressed comprising a pick-up bar adapted to engage under the article, a clamp-bar slidable on the said pick-up bar, means for causing said bars to approach the article with their gripping elements spaced apart, means for causing the clamp-bar to move to gripping position after the pick-up bar has engaged under the said article, means for causing the said bars to move away from the die with the clamp bar in gripping position, and means for moving said clamp-bar to non-gripping position.

In testimony whereof, SAMUEL THOMAS WALKUP has signed his name to this specification in the presence of two subscribing witnesses, this 3rd day of February 1919.

SAMUEL THOMAS WALKUP.

Witnesses:
A. H. JORDAN,
B. L. ROTH.